Figure 1:
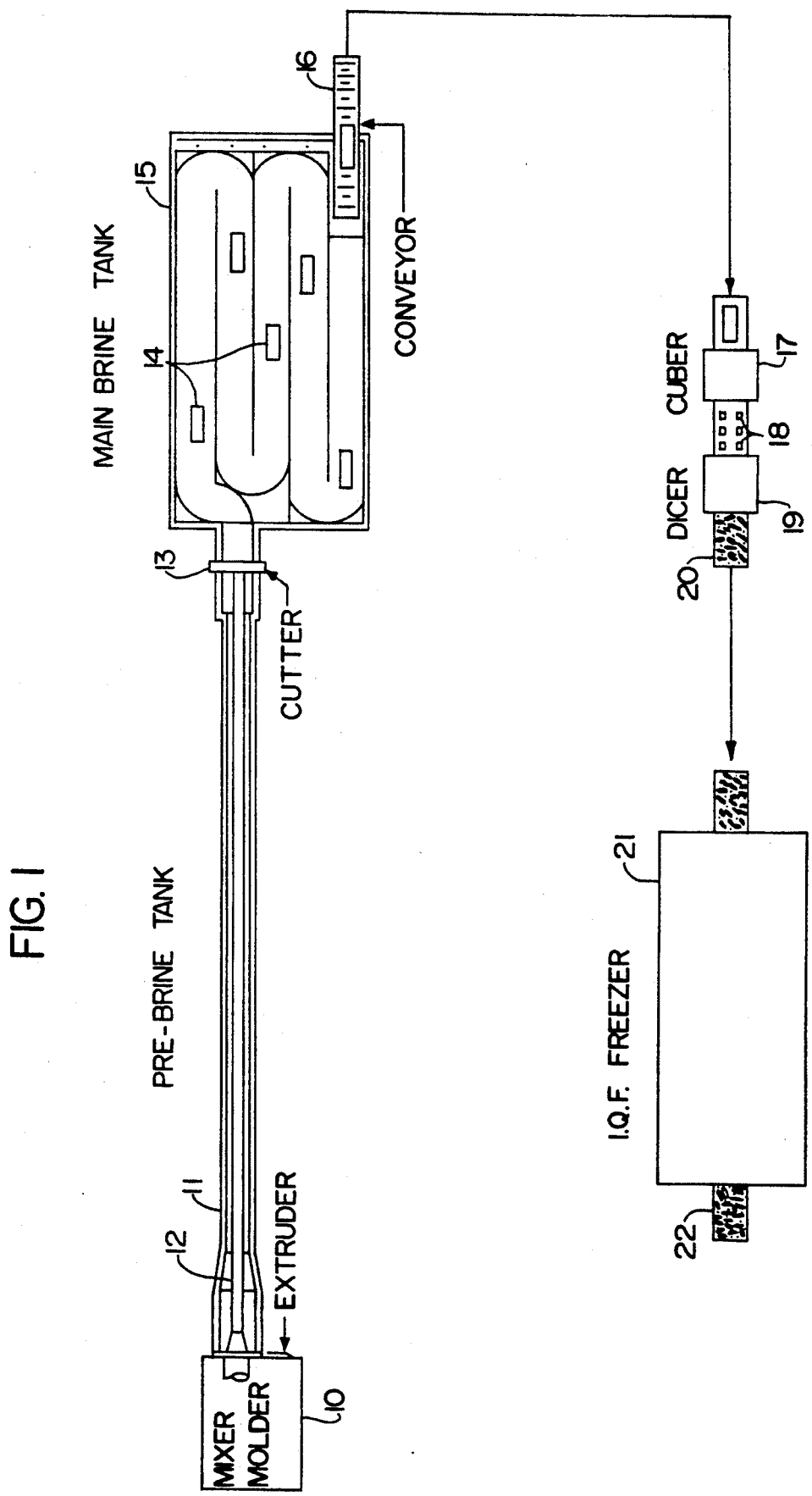

United States Patent [19]

Barz et al.

[11] Patent Number: 5,200,216
[45] Date of Patent: Apr. 6, 1993

[54] PROCESS OF MAKING ACCEPTABLE MOZZARELLA CHEESE WITHOUT AGING

[75] Inventors: Richard L. Barz, Castle Rock; Carolyn P. Cremer, Denver, both of Colo.

[73] Assignee: Leprino Foods Company, Denver, Colo.

[21] Appl. No.: 592,519

[22] Filed: Oct. 4, 1990

[51] Int. Cl.$^5$ ............................................. A23C 19/14
[52] U.S. Cl. ...................................... 426/36; 426/96; 426/582; 426/289; 426/296
[58] Field of Search ................... 426/36, 582, 76, 289, 426/296

[56] References Cited

U.S. PATENT DOCUMENTS

| | | | |
|---|---|---|---|
| 2,816,036 | 12/1957 | Lederer | 99/116 |
| 3,347,181 | 10/1967 | Pizzo | 426/19 |
| 3,615,679 | 10/1971 | Tangel | 426/19 |
| 3,667,963 | 6/1972 | Katter | 426/94 |
| 3,859,446 | 1/1975 | Sullivan | 426/36 |
| 3,961,077 | 6/1976 | Kielsmeier | 426/36 |
| 3,966,970 | 6/1976 | Williams | 426/393 |
| 4,112,834 | 9/1978 | Thiry | 426/290 |
| 4,159,349 | 6/1979 | Caiello | 426/94 |
| 4,283,431 | 8/1981 | Giordano | 426/296 |
| 4,285,979 | 8/1981 | Izzi | 426/94 |
| 4,339,468 | 7/1982 | Kielsmeier | 426/582 |
| 4,367,243 | 1/1983 | Brummett | 426/391 |
| 4,626,439 | 12/1986 | Meyer | 426/517 |
| 4,753,815 | 6/1988 | Kielsmeier | 426/582 |
| 5,030,470 | 7/1991 | Kielsmeier | 426/582 |

FOREIGN PATENT DOCUMENTS 141283 5/1971 Czechoslovakia.

OTHER PUBLICATIONS

Freeman, "Accelerating the Aging Process in Cheddar Cheese", Kentucky Agric. Experiment Station, U. Kentucky, Bulletin 666 (Jun. 1959).
Kristofferson, et al., "Cheddar Cheese Flavor IV. Directed and Accelerated Ripening Process", J. Dairy Sci. vol. 50, No. 3 292-297 (1967).
Singh, et al., "Factors Affecting Flavor Development in Cheddar Cheese Slurries", J. of Dairy Sci. vol. 53, No. 5, 533-536 (1969).
Sutherland, "Rapidly Ripening Cheese Curd Slurries in Processed Cheese Manufacture", the Australian J. of Dairy Tech., vol. 30, 138-142 (1975).
Shehata, et al., "Effect of Adding Sodium Citrate to Buffaloes' Milk on Chemical and Organoleptic Properties of Ras Cheese", Dairy Sci. Abstracts, vol. 41, No. 9, 550 (1979).
Lee, Hyong Joo, "Acceleration of Cheese Ripening: High Pressure Injection and Diffusion of Curing Components in Italian-Type Cheese", Ph.D. Thesis, U. Wisconsin-Madison, 1979.

(List continued on next page.)

Primary Examiner—Carolyn Paden
Attorney, Agent, or Firm—Fitzpatrick, Cella, Harper & Scinto

[57] ABSTRACT

In the manufacture of mozzarella cheese, aging can be dispensed with if the process is controlled to yield a combined moisture and wet milkfat content of at least about 70 weight percent, and the cheese will provide acceptable bake performance under typical cooking conditions used in the pizza industry today. Within about 48 hours after brining, the cheese should either be used or frozen. This discovery saves at least seven days of aging and permits the use of a continuous process of making mozzarella, which, from pasteurization to loading of the frozen product on the truck, can be performed in as little time as eight hours. In the continuous process, the hot stretched cheese from the kneading machine is extruded directly into cold brine. After the cheese has cooled sufficiently, it can be comminuted and frozen by independent quick freezing, preferably in a fluidized bed freezer. Salt preferably is mixed into the cheese during the kneading step.

74 Claims, 6 Drawing Sheets

OTHER PUBLICATIONS

Abdel Baky, et al, "Ripening Changes in Cephalotyre 'Ras' Cheese Slurries", J. Dairy Research, vol. 49, 337–341 (1982).

Law, Barry A., "Proteolysis in Relation to Normal and Accelerated Cheese Ripening", Cheese: Chemistry, Physics and Microbiology (Elsevier Applied Science, New York, N.Y. 1987, Edited by P. F. Fox, vol. 1, Ch. 10, 365–392).

Oberg, Craig, "Controlling the Body and Texture of Mozzarella Cheese: Microbiological Methods", (Paper (23 pp.) presented at 9th Biennial Cheese Industry Conference, Utah State Univ., Logan, Utah, Aug. 21–23, 1990).

Kinstedt, Paul S. and Kiely, Joseph L., "Physical and Chemical Methods for Controlling the Body and Texture of Mozzarella Cheese", (Pater (33 pp.) presented at 9th Biennial Cheese Industry Conference, Utah State Univ., Logan, Utah, Aug. 21–23, 1990).

PROCESS OF MAKING ACCEPTABLE MOZZARELLA CHEESE WITHOUT AGING

I. FIELD OF INVENTION

The present invention relates to a continuous process of manufacturing, comminuting, and packaging varieties of mozzarella cheese, and more particularly to a process in which the cheese produced is functional for use without being subjected to further aging or treatment. The present invention also relates to the composition of the mozzarella cheese produced using this process. The milkfat, protein, and moisture components are adjusted in a manner to achieve the desired performance characteristics.

II. BACKGROUND

The dairy industry, and more particularly the cheese industry, for many years has attempted to reduce the length of time required during the manufacturing process to obtain the desired and expected performance characteristics of a cheese. The performance characteristics most commonly associated with mozzarella cheese varieties are those exhibited when cooking these varieties on a pizza. These include melt characteristics as to the degree of blistering, meltdown, stretch, and tenderness. The capability of shortening the aging process, or eliminating it altogether, has significant economic benefits directly associated with the costs of aging cheese.

Mozzarella variety cheeses are made by a process involving the following steps:

a) pasteurizing cow's milk having a fat content in the range of about 1.5 to 3.5 weight percent (in some countries water buffalo milk is used);

b) fermenting the milk with one or more lactic acid-producing bacteria to obtain a cheese milk;

c) coagulating the cheese milk to obtain a coagulum comprised of curd and whey;

d) cutting the coagulum and draining the whey therefrom, thereby leaving a cheese curd;

e) heating, kneading, and stretching the cheese curd until it is a homogeneous, fibrous mass having a moisture content in the range of about 45 to 60 weight percent and a milkfat content of at least about 30 weight percent (dried solids basis);

f) placing the mass in a bath of cold brine and leaving it there long enough to achieve cooling and salt penetration: and g) removing the cooled cheese from the brine.

After the brining step the resultant unripened mozzarella cheese traditionally has been aged at about 35° to 45° F. for approximately seven to 21 days, to develop characteristic taste and texture, as well as acceptable baking characteristics. (The aging process also is sometimes referred to as "ripening," "curing," or "maturation.") All of the major components of cheese, i.e., carbohydrates, protein, and fat, are subject to change during aging. Through a complex variety of metabolic processes, e.g., enzymatic lipolysis and proteolysis, these principal components are metabolized to lactic acid, peptides, amino acids, and fatty acids.

After aging, the mozzarella cheese often is comminuted and frozen, so as to halt the ripening processes, and then shipped in refrigerated containers. It may be frozen in block form as well, but seldom, if ever, is.

The baking characteristics of mozzarella cheese are very important. Most mozzarella cheese is used to make pizzas. This entails spreading tomato sauce and the cheese (in comminuted form) on a base of pizza crust and then baking the resultant pizza in an oven maintained at a temperature in the range of about 400° to 1000° F., often within the range of about 450° to 650° or 850° F. As is well known, a great variety of other food materials, such as pepperoni slices, mushroom slices, ground beef, sausage, and pineapple chunks, may be used as toppings on the pizza as well. As the cheese melts, the cheese components begin to fluidize, which can result in water evaporation, release of oil, and blistering. What is desirable is that the cheese thoroughly melt before the crust is overbaked. What is undesirable is that the cheese form many large blisters as it melts. The blisters, which are formed by the protein, can burn, creating dark hard scabs that can detract from the appearance, taste, and mouth feel of the pizza. To be satisfactory, the cheese needs to melt with minimal blistering, while the crust bakes.

If not subjected to an aging step, mozzarella variety cheeses have tended to blister significantly when used to make baked pizzas. The higher the oven temperature, the greater the risk of blistering.

Ripening of mozzarella variety cheeses requires considerable time, space, and energy, however, which adds to the cost of the finished product. The same is true of other varieties of cheese as well, to a greater or lesser extent. For this reason many approaches have been tried in an attempt to find ways to accelerate the ripening process for several types of cheese.

Lederer, in 1953, disclosed that the aging time for American cheddar cheese can be shortened by quick freezing the cheese when green, holding it frozen for 60 to 180 minutes, and then transferring the cheese to a conventional aging room maintained at 45° to 60° F. Good body, texture, and flavor is achieved after only nine days of aging, as contrasted with at least six weeks by the conventional process. (Lederer, U.S. Pat. No. 2,816,036, "Cheese Manufacture," filed May 1, 1953, issued Dec. 10, 1957.)

Freeman, in 1959, disclosed that the aging of cheddar cheese can be accelerated by using a mixture of cultures and a higher temperature (60° F.) for the first four weeks. (Freeman, "Accelerating the Aging Process in Cheddar Cheese," Kentucky Agric. Experiment Station, U. Kentucky, Bulletin 666 (June 1959).)

Kristofferson, in 1967, taught that the addition of reduced glutathione and porcine lipase to a slurry of the cheese will accelerate the ripening of cheddar when making a cheese paste. (Kristofferson, et al. "Cheddar Cheese Flavor. IV. Directed and Accelerated Ripening Process," J. Dairy Sci. Vol. 50, No. 3, 292-297 (1967).)

Singh, in 1969, disclosed that the aging of cheddar cheese curd while in slurry form can be accelerated by the addition of sodium citrate and a combination of vitamins and minerals. (Singh, et al., "Factors Affecting Flavor Development in Cheddar Cheese Slurries," J. of Dairy Sci. Vol. 53, No. 5, 533-536 (1969).)

Prochazka, in 1971, disclosed the addition of sodium citrate to "mozzarella-type" cheeses to shorten the ripening period by at least one-third. (Czechoslovak Patent No. 141,283, "Process for the Production of Cheeses with Accelerated Ripening," May 15, 1971.)

Sullivan et al., in 1973, disclosed that American cheese and Swiss cheese can be ripened two to five times faster by adding adenosine-3',5'-cyclic monophosphate to the cheese curd. (Sullivan et al., U.S. Pat. No.

3,859,446, "Method for Rapid Curing of Cheese," filed Sep. 26, 1973, issued Jan. 7, 1975.)

Sutherland, in 1975, taught that the time required to ripen cheddar cheese slurries can be shortened by adjusting a variety of different conditions, including headspace oxygen in the aging vessel. (Sutherland, "Rapidly Ripening Cheese Curd Slurries in Processed Cheese Manufacture," the Australian J. of Dairy Tech., Vol. 30, 138–142 (1975).)

Shehata et al., in 1977, taught that the addition of sodium citrate to raw water buffalo milk accelerates lipolysis and proteolysis of Ras cheese prepared therefrom (Shehata et al., "Effect of Adding Sodium Citrate to Buffaloes' Milk on Chemical and Organoleptic Properties of Ras Cheese," Dairy Sci. Abstracts, Vol. 41, No. 9, 550 (1979).)

Lee, in 1979, proposed injecting a pregastric esterase solution into mozzarella cheese to shorten the aging process. (Lee, Hyong Joo, "Acceleration of Cheese Ripening High Pressure Injection and Diffusion of Curing Components in Italian-Type Cheese," Ph.D. Thesis, U. Wisconsin-Madison, 1979.) Lee's thesis includes a literature review on the acceleration of cheese ripening. Id., 2–45. He reports that the ripening process, like most chemical reactions, is accelerated at higher temperatures, but in many cases undesirable reactions also occur, yielding off-flavored products. Id., at 17.

Abdel Baky, in 1982, reported the results of experiments demonstrating that the addition of sodium citrate, proteinase, and lipase to a Ras cheese slurry can shorten the curing time from two months to seven days. (Abdel Baky, et al., "Ripening Changes in Cephalotyre 'Ras' Cheese Slurries," J. Dairy Research, Vol. 49, 337–341 (1982).)

Law, in 1987, wrote that the ripening of various cheeses can be accelerated by the addition of exogenous proteolytic enzymes. (Law, Barry A., "Proteolysis in Relation to Normal and Accelerated Cheese Ripening," Cheese: Chemistry, Physics and Microbiology (Elsevier Applied Science, New York, N.Y. 1987, Edited by P. F. Fox, vol. 1, ch. 10, 365–392.) (Adding lipases or esterases has been common practice in Italian-type cheese manufacture since the 1950's.)

With regard to all of these prior art processes, however, some amount of aging has been indicated as being necessary.

III. BRIEF DESCRIPTION OF THE INVENTION

It has now been discovered that varieties of mozzarella cheese exhibiting desired performance characteristics can be produced by a process which eliminates the requirement for a separrate aging step. In the process of the present invention the conventional steps of producing a mozzarella variety cheese are employed, but the ingredients and conditions are controlled so that the cheese obtained from the brining step has a combined moisture and wet milkfat content of at least about 70 weight percent. Means by which the moisture and milkfat contents of the final cheese can be controlled are known in the mozzarella-making art. Thus, for example, the milkfat content can be controlled at the point where the excess fat in the milk is removed in a separator. This is just prior to pasteurization. The moisture content can be controlled, for example, by controlling the amount of acid production during fermentation, in addition to adjusting the temperature and length of the cooking step.

Mozzarella cheeses on the market today most often have a combined moisture and wet milkfat content below 70 percent, e.g., in the range of about 65 to 69.5 percent. Also, of course, they are aged. Typical composition examples for the four most common varieties on the market at this time are as follows:

| Variety[1] | Wt. % Moisture[2] | Wt. % Milkfat, Wet Basis[3] | Wt. % Milkfat, FDB[4] |
|---|---|---|---|
| Mozzarella | 52 or more | 21.6 or more | 45 or more |
| Low-moisture mozzarella | 46 | 24.8 | 46 |
| Part-skim mozzarella | 52.5 | 16.6 | 35 |
| Low-moisture part-skim mozzarella | 50 | 18.25 | 36.5 |

[1] As defined by the U.S. Code of Federal Regulations, Chapter 21, Sections 133.155 through 133.158.
[2] Bound plus free water-i.e., percent of weight lost when dried overnight in a 200° C. oven.
[3] Percent based on weight of entire cheese, not just solids.
[4] "Fat on Dry Basis"-percent based on weight of dried solids in cheese.

We have found that the mozzarella cheese produced by the present process can be used immediately to make satisfactory pizzas. No aging is required; in fact it may not even be desirable. The unripened cheese already has the desired performance characteristics for use in preparing baked foods. It can be frozen immediately and shipped. It is believed that, if kept frozen, the cheese will retain satisfactory performance characteristics for as long as 12 months.

The cheese should be used or frozen within 48 hours after completion of the brining step. If it is not used or frozen within that time, some control over its melt performance properties will be lost. The cheese then will tend to burn and blister when baked, unless it is first allowed "to age out"—i.e., is left unused for at least about five more days. In a particularly advantageous embodiment, the present process can be performed in a continuous manner, with the cheese being comminuted and frozen within only two hours after being brined.

The cheese may be formed into loaves and frozen in that shape, if desired; but preferably it will be comminuted before freezing. If it is frozen in loaf form, then from the pasteurization of the milk to the loading of boxed loaves of the frozen, finished cheese on trucks, the entire process can be performed in as little as 36 hours. If the cheese is diced or shredded before freezing, and the freezing is accomplished by independent quick freezing, then the entire process, from pasteurization to shipping, can be completed in even less time, e.g., in as little as about eight hours. In contrast thereto, prior art methods have required an additional 7 to 21 days of aging to achieve the desired performance characteristics.

The mozzarella cheese produced by the present process can be used immediately by the pizzerias to which it is shipped. No holding time is required. If it has been independently quick frozen by the method disclosed in U.S. Pat. No. 4,753,815 to Kielsmeier et al., it does not even have to be thawed first; it can be put in the oven in the frozen state. Under typical cooking conditions used in the pizza industry today, the cheese of the present invention performs as well or better on pizzas as mozzarella having less than 70 percent combined moisture and wet milkfat that has been aged the customary 7 to 21 days.

If a mozzarella cheese having significantly less than 70 percent combined moisture and milkfat was immediately frozen and shipped after being removed from the brine, it likely would have to be thawed and held in a cooler at about 35° to 45° F. for seven days or more before it could be used on a pizza and produce satisfactory melt performance under typical cooking conditions used in the pizza industry today. Such cheese either has to be aged for at least one week before it is frozen, or, if it is immediately frozen, it has to be thawed and then aged for at least a week before it can be satisfactorily used in baking pizzas under typical conditions used in the industry today. It is conceivable that unaged, under 70% cheese could be made to exhibit acceptable melt properties under limited, atypical cooking conditions, but what is needed is a mozzarella that pizzerias can use under standard conditions of baking time and temperature. The cheese produced by the process of the present invention is such a cheese, even though it is produced without aging.

IV. DESCRIPTION OF DRAWINGS

The file of this patent contains at least one drawing executed in color. Copies of this patent with color drawings will be provided by the Patent and Trademark Office upon request and payment of the necessary fee.

FIG. 1 is a schematic overhead view of part of a production line employing the process of the present invention in a continuous manner.

Figure 2:
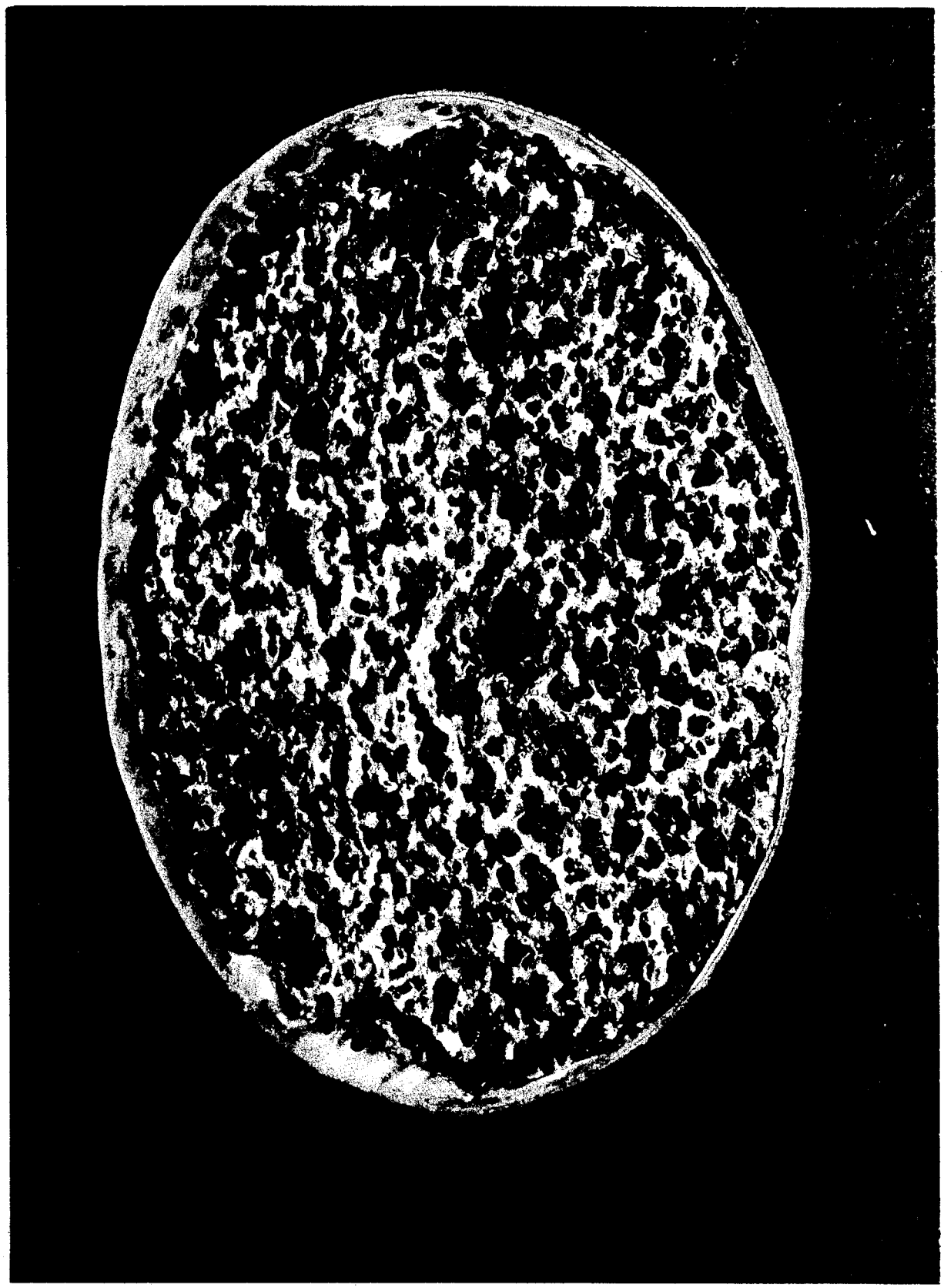
Figure 3:
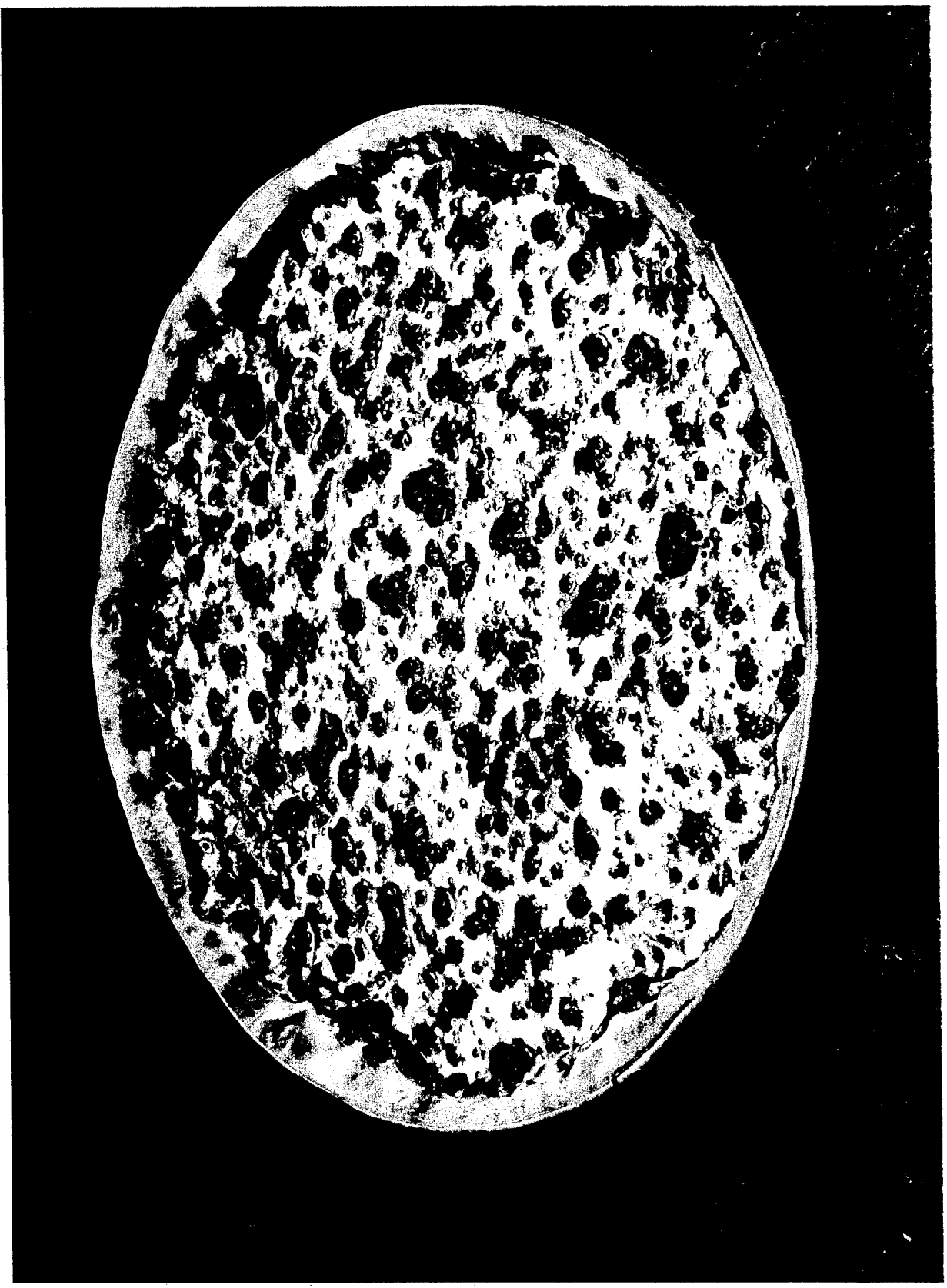
Figure 4:
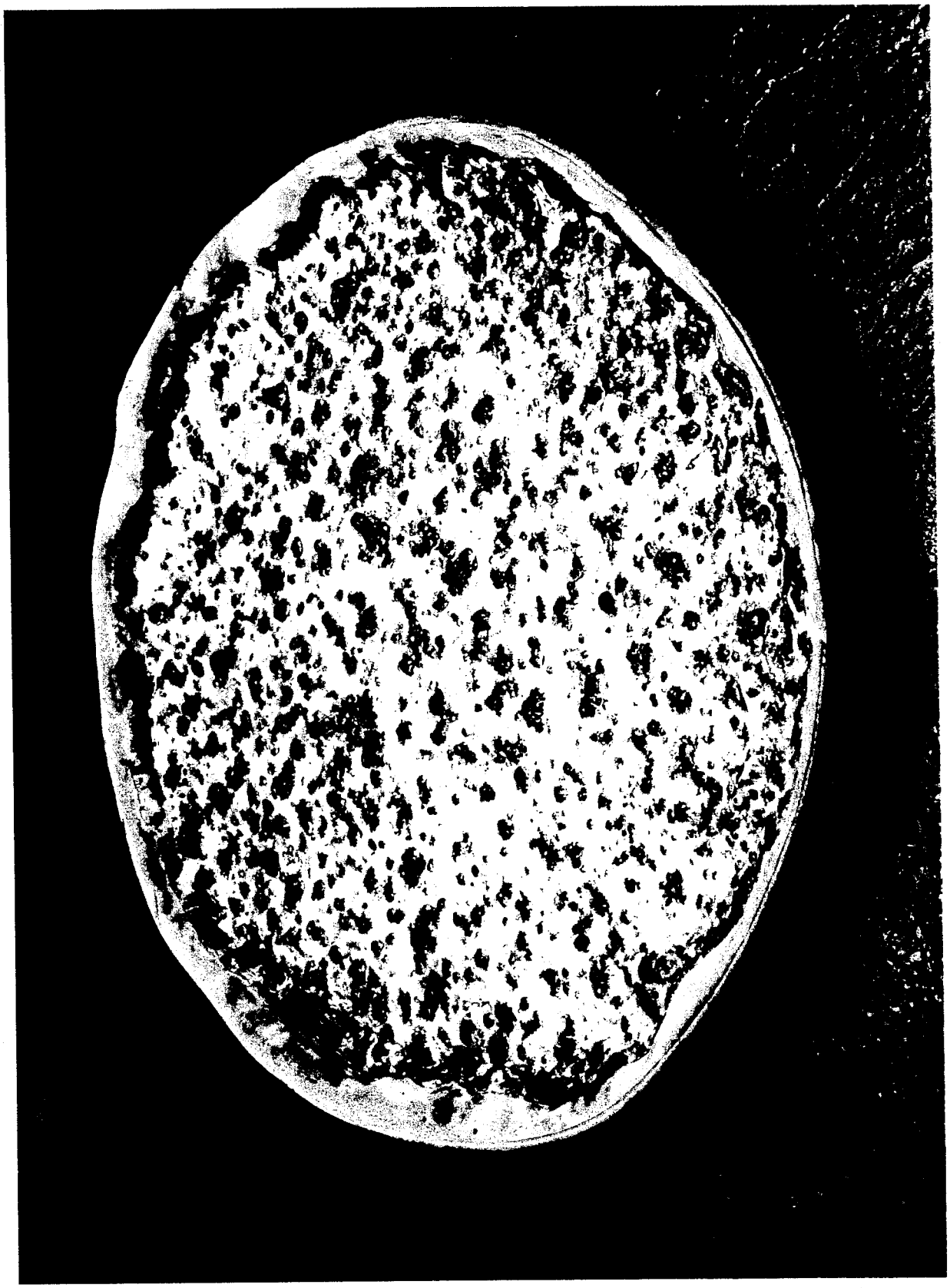

FIGS. 2, 3, and 4 are photographs of pizzas baked using an unsatisfactory unaged mozzarella (FIG. 2), a conventional aged mozzarella (FIG. 3), and an unaged mozzarella prepared by the process of the present invention (FIG. 4).

Figure 5:
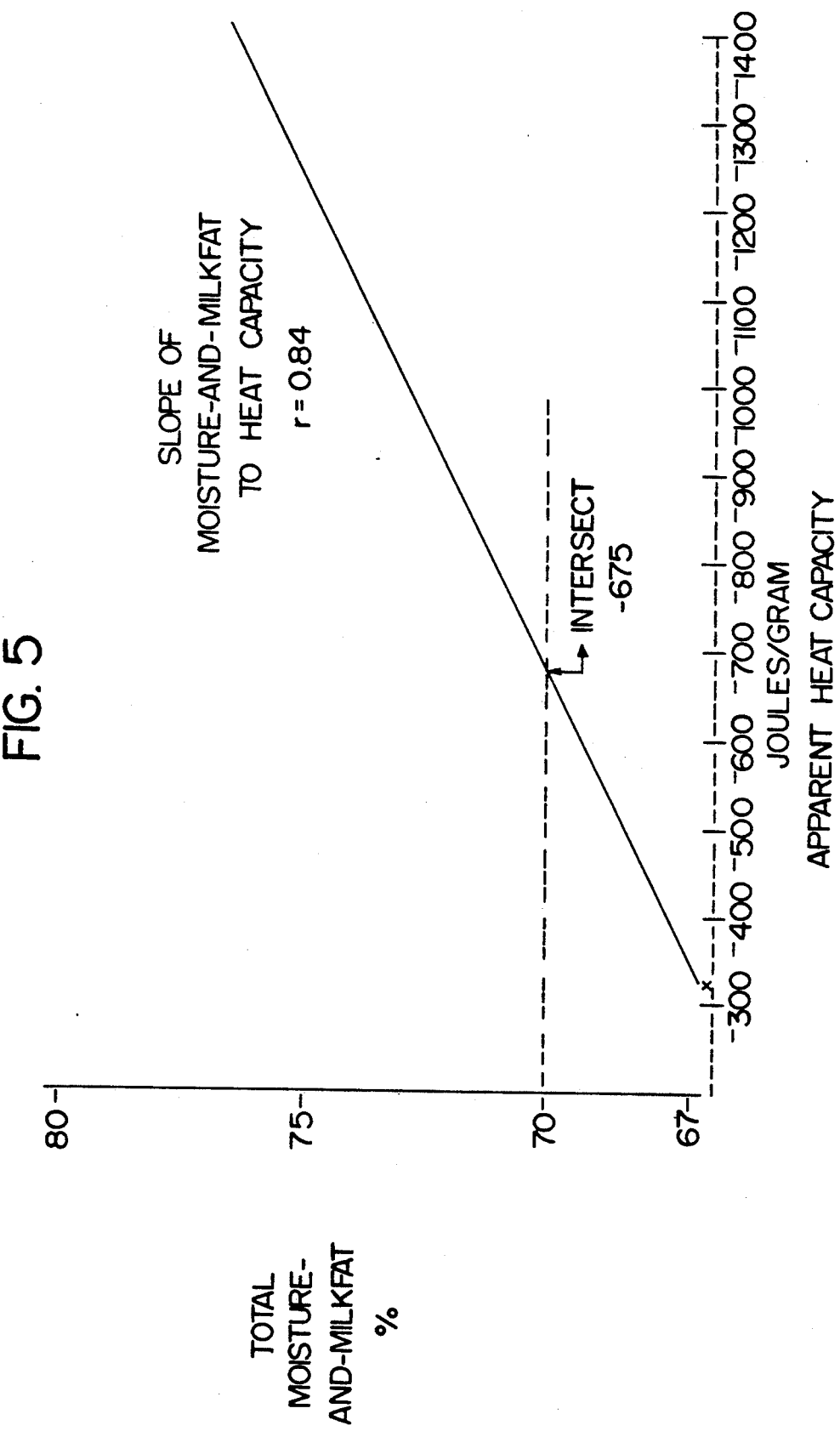
Figure 6:
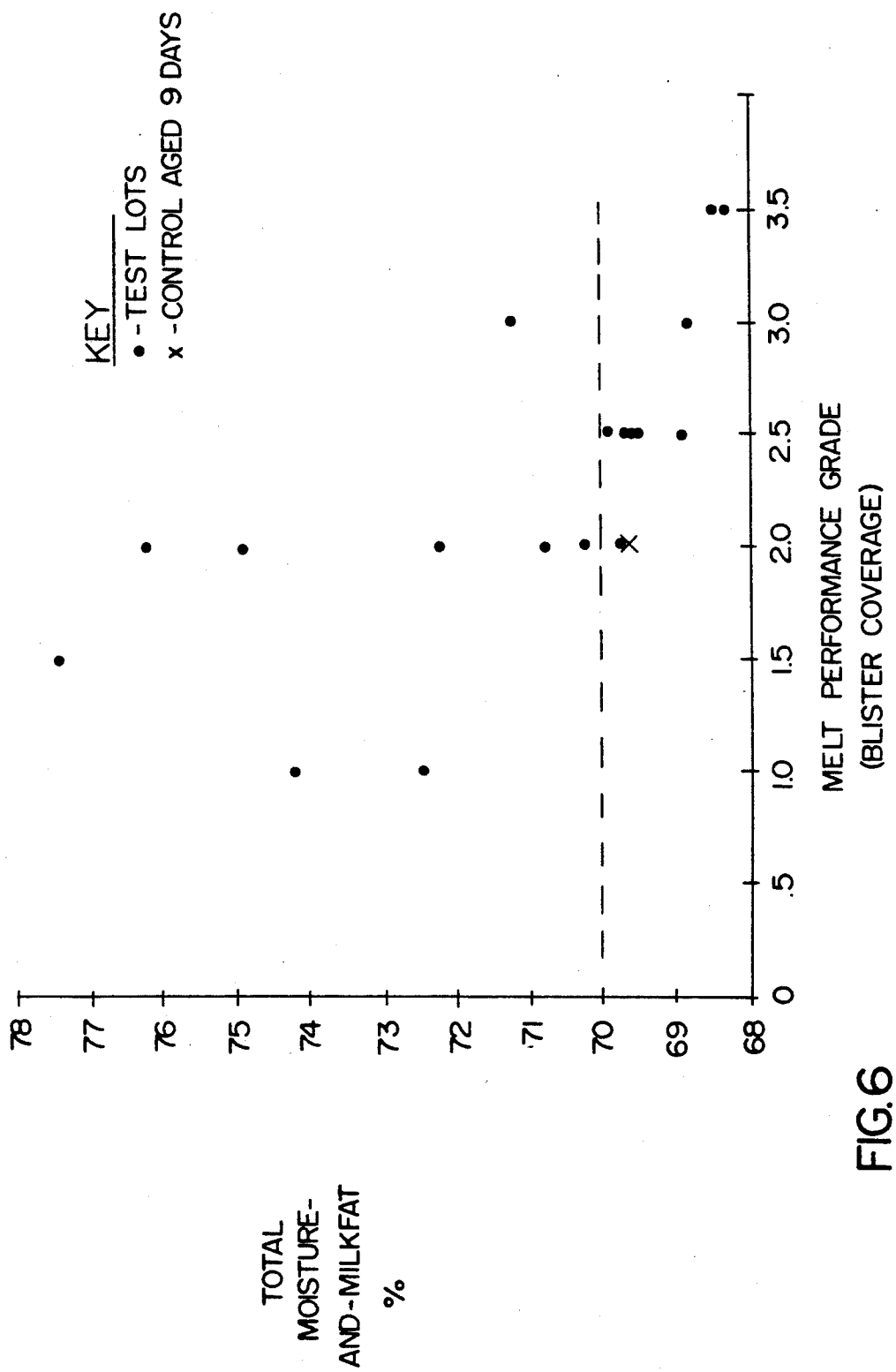

FIG. 5 is a graph showing the relationship combined moisture and milkfat content to apparent heat capacity of cheese prepared by the process of the present invention. FIG. 6 is a graph showing the relationship of combined moisture and milkfat content of unaged mozzarella cheese to its melt performance.

V. DETAILED DESCRIPTION OF INVENTION

The pizza industry most commonly uses mozzarella cheese as one of the primary components of a pizza. The various styles of pizzas (i.e., thin crust, thick crust, etc.), as well as the type of oven used, will significantly influence the performance, or melt characteristics, of the mozzarella cheese. Additionally the amount of time for which a pizza is cooked (and the temperature at which it is cooked), will have similar influences on the performance of the cheese. Thus, when cooking mozzarella cheese on a pizza, the amount of energy available to obtain the desired melt characteristics is dictated, and limited, by these cooking conditions.

Performance, specifically melt characteristics such as blistering, meltdown, and stretch, are important to the pizza maker, because it is these characteristics which are most apparent to the end consumer and which contribute to the overall enjoyment of eating pizza. As mentioned above, it has been generally accepted that to obtain such melt characteristics, mozzarella cheese, regardless of its composition, requires aging for seven days or more. The present invention provides a process which eliminates the requirement of aging, or any further treatment, of the mozzarella cheese, yet achieves similar melt characteristics to those of prior art cheese that has been aged.

There are three primary components of mozzarella cheese which influence melt characteristics: moisture, milkfat, and protein. It has been understood that all of these components, individually as well as in combination, play a role in the performance characteristics of mozzarella cheese. Of the three it is the protein, and, more specifically, the complexity of the protein structure, which is the primary limiting factor as regards the final melt characteristics obtained. The protein structure, more than any other component of cheese, requires the highest degree of heat (i.e., caloric energy) to cause it to become fluid, or melted, when cooked on a pizza. In becoming fluid, the long, string-like protein molecules must unravel. This unraveling typically requires that the cheese be heated to a temperature in the range of about 150° to 200° F. This temperature range also coincides with temperatures most commonly achieved when cooking a pizza. Only with this unraveling of the protein structure can the desired melt characteristics be achieved.

It is well understood that temperature is a measurement of the average kinetic energy released by a substance; and therefore the temperature of a molten substance is a function of the amount of energy absorbed, the melting point of the substance, and the resultant energy released. Thus, to obtain the necessary temperature to unravel and melt a cheese's protein structure, a certain amount of energy is required to be absorbed by the cheese. Once melting is complete, energy will be released and the temperature of the cheese will rise more easily. In cooking a pizza, other components of the pizza (i.e., the dough, the sauce, etc.) additionally require energy to ensure that their desired baked characteristics are obtained as well. The amount of energy available, as well as the transfer of energy, is limited, based on the particular style of pizza and the particular cooking condition (i.e., oven time and temperature). The pizza cannot be left in the oven for an extended period of time to cook the cheese, or else the crust and other ingredients will deteriorate.

Until now it has been believed that the energy available under the cooking conditions commonly used in the pizza industry is not sufficient to fluidize the complex protein structure associated with mozzarella cheese unless the cheese has been aged. Aging partially breaks down the protein through proteolysis. The smaller protein units (peptides), which are less complex in structure, do not require as much energy to unravel.

Secondary effects aging has on the performance characteristics of mozzarella cheese are equilibration of salt within the cheese and a changing of the ratio of free water to bound water in the cheese. By "bound water" is meant water that is chemically or physically bound to other components in the cheese. The rest is "free water." Both of these factors have an influence on the final melt performance of mozzarella cheese. Blistering of cheese on a baked pizza is believed to be caused by a burning or drying out of the protein present. Thus, when cooking cheese on a pizza it is believed to be critical that to avoid excessive blistering the protein structure retain moisture as it melts. However, if there is too much free water in the cheese, such water will be flashed off during the cooking process, resulting in a high degree of blistering. On the other hand, cheese which has a significant amount of bound water, most commonly associated with aging of the cheese, will have a tendency not to blister as much, as this bound water will not flash off as readily, thus keeping the protein structure moist.

In the process and the resultant product described by this invention, it is believed that the excessive flashing off or free water is avoided by the following factors:

1) Incorporation of salt during the mixing/molding step. Salt has the ability to "bind" water, thus retaining in the cheese some of the free water which otherwise might be flashed off during cooking.

2) By having the proper moisture and milkfat contents, and thus obtaining a high enough heat capacity, the protein and milkfat become fluid early enough in the cooking process to retain the free water before it can be flashed off.

We also have discovered that mozzarella cheese produced by the present process, after being cooled in the brine, can be held for up to 48 hours prior to being comminuted and packaged, and still it will yield desired performance characteristics. The preferred time of comminuting is within two hours after brining. This optimizes the cheese's performance characteristics, while maintaining the production efficiencies associated with a continuous process. Holding the cheese in an unfrozen state beyond about 48 hours can result in the product becoming too soft to properly comminute into cheese granules. This appears to be particularly the case if the cheese has a moisture content in the range of about 52 to 60 weight percent and a wet milkfat content in the range of about 20 to 30 weight percent.

We have also observed that product which is held beyond 48 hours before being frozen tends to require traditional aging (generally a total of 7-21 days) to obtain the desired melt characteristics.

Without wishing to be bound by theory, we believe that the relationship between the moisture content and the state of the protein is such that within the first 48 hours after completion of the brining, the desired melt characteristics can be achieved, but that after this time there is a shift in this relationship, such that only by aging the cheese for a week or more can the desired melt performance be obtained. One can generally arrest and preserve the desired properties in the unaged cheese by freezing it within the 48 hour period. Slow or fast freezing methods can be used. Preferably, the cheese will be frozen to a core temperature of about 25° F. or lower.

When used to make pizzas, the cheese prepared by the process of the present invention, together with tomato sauce (other ingredients are optional), can be spread on a pizza crust that is either frozen or unfrozen. Also, the crust can be either unbaked, par baked, or fully baked. The cheese generally can be thawed as far ahead as 14 days prior to being placed in the oven. As mentioned above, however, it need not be thawed long prior to baking. It will perform well if thawed only one or two days prior to use. Moreover, if the cheese has been frozen by the IQF method disclosed in U.S. Pat. No. 4,753,815, it can be placed in the oven without any pre-thawing, and still it will exhibit the desired baking characteristics.

In the present process the ingredients and conditions generally are controlled to yield a cheese moisture content in the range of about 50 to 60 weight percent and a wet milkfat content in the range of about 16 to 30 weight percent. The preferred composition to which the mozzarella cheese is held in the present process is a moisture content of at least 52 percent and a wet milkfat content of at least 18 percent As mentioned above, one of the purposes aging serves is to allow salt (sodium chloride) diffusion from the outer crust into the center of mozzarella loaves, thereby equilibrating the salt concentration in the cheese. Since aging is omitted in the present process, it is preferred to mix into the fresh cheese curd about 0.5 to 1.5 percent salt (based on the weight of the curd) during the heating, kneading, and stretching operation. Most preferably at least 0.8 weight percent salt will be added.

After the cheese curd is heated, kneaded, and stretched into a homogeneous, fibrous mass, it is brined. The mass will typically be at a temperature of about 125°-155° F. The hot mass can be extruded directly into a brine tank, or it can be hand-molded into loaves (e.g., measuring about 3½" by 7" by 22") and chilled in cold water first. When hand-molded, the mass is placed in stainless steel molds which are immersed in cold water (about 35° to 50° F.) for about 20 to 30 minutes. This cools the cheese enough to allow it to hold its shape. Then it is removed from the molds and placed in a brine tank typically having a temperature of about 35°-55° F. and a salinity of about 50-98 wt. %.

Hand molding is labor intensive, however, and extrusion of a ribbon of the hot fibrous mass directly into a "super cold" brine solution is preferred. The ribbon preferably is about 6 to 8 inches wide and 3 to 4 inches thick. The super cold brine will typically be at a temperature in the range of about 0° to 25° F. and will have a salinity of about 30-60 wt. %. The cheese is rapidly chilled in the super cold brine so as to set it quickly. If not adequately set before the ribbon is cut, the chunks of cheese will tend to deform and lose their uniform shape. The cheese ribbon generally will be adequately set if its core temperature is dropped to about 120° F. or below, e.g., within the range of about 90° to 110° F. Usually this requires no more than about 10 minutes in the super cold brine. The extruded ribbon of cheese may be cut into lengths of about 20 to 26 inches after it is set in the super cold brine. The chunks of cheese may then be further cooled in the main brine tank, in which the temperature is about 35°-55° F. and the salinity is about 50-98%.

Whether the cheese is extruded and cut, or it is hand-molded, the large chunks of cheese preferably are left in the main brine tank until their core temperature drops to about 75° F. or below, e.g., in the range of about 55°-75° F. Using the extrusion process and two-step brining, the cheese can be chilled to a core temperature at or below 75° F. within about three hours.

It has been found that a core temperature of about 75° F. or below is desired to comminute the loaves of salted cheese into granules. Temperatures in excess of 75° F. often result in a cheese in which free moisture and liquid milkfat are present. When comminuted, these ingredients are not fully retained in the cheese granules. Additionally, cheese above 75° F. tends to stick to the equipment used to cut the cheese. The time required to cool the heated cheese to below 75° F. can be reduced by decreasing the thickness of the cheese and/or by lowering the brine temperatures used.

For use as a pizza topping, the cheese preferably is comminuted into a final size in which the center, or core, of each piece is no more than about ⅛" from the surface, and most preferably not more than 1/16" from the surface.

Preferably the final size pieces of cheese are subjected to independent quick freezing immediately after comminuting, to form an easy flowing, frozen product. The freezing preferably is conducted in a fluidized bed freezer, using cold air, e.g., at a temperature of about −20 to −40° F.

The amount of cheese present in the freezer at any one time preferably will be small enough that each piece of cheese is cooled to a core temperature of about −10° F. within no more than about 5 to 7 minutes after it enters the freezer. Preferably the cheese pieces ultimately will be frozen to a core temperature below about −10° F., e.g., in the range of about −10° to −25° F., before being removed from the freezer.

The quick freezing step preferably is conducted in such a way as not to allow the cheese moisture content to drop any substantial amount, e.g., so as not to lose more than about one percent of its weight due to moisture evaporation.

As the frozen pieces of cheese leave the freezer, they may, if desired, be coated with a flavoring additive and/or one or more other cheese chemicals, e.g., an emulsifier such as sodium citrate and/or a surfactant such as a dimethyl polysiloxane.

The preferred manner of applying any flavoring agent, emulsifier, or surfactant to the cheese pieces is by spraying an aqueous solution or emulsion of the additives on the frozen pieces of cheese, while tumbling the pieces in order to coat them uniformly. The various additives can be applied either together or from separate solutions. The solution concentration and rate of coating application preferably will be adjusted so as to apply about 10 to 2000 ppm of the flavoring agent, about 10 to 2500 ppm of the emulsifier, and about 1 to 10 ppm of the surfactant (all based on the weight of the cheese) and to coat the cheese with about 0.5 to 4% of water (also based on the weight of the cheese). The cheese and the water should both be cold enough that the spray forms an icy coating on the cheese pieces practically instantaneously.

EXAMPLE 1

Part-skim mozzarella cheese curd was manufactured using the overnight-curd-hold system described in U.S. Pat. No. 3,961,077 to Kielsmeier. A starter culture containing lactobacillus and streptococcus organisms was used, and the cheese milk was coagulated by the addition of veal rennet. The composition of the curd was controlled to obtain a final cheese product having a moisture content greater than 52% and a milkfat content greater than 18%—thus a total moisture/milkfat content greater than 70%.

The cheese curd was held overnight, after which the fermentation was complete. FIG. 1 of the accompanying drawings is a schematic representation of the process from this point on. Referring to FIG. 1, the fermented curd (not shown) was then heated in Mixer/-Molder 10° to 140° F., while being kneaded and stretched, with 1.5% salt (sodium chloride) (not shown) added. After about five to seven minutes of mixing, the molten cheese was extruded into Pre-Brine Tank 11 in the form of a 4"×7" continuous ribbon 12, following the method described in U.S. Pat. No. 4,339,468 to Kielsmeier. The extruded ribbon flowed directly into the "super cold" sodium chloride brine, which was at 10° F. and had a 60% salinity level. The dwell time of the ribbon in the brine was 8 minutes, at which time the 4"×7" ribbon was lifted out of tank 11 and severed by Cutter 13 into 20-inch lengths 14. The cheese's core temperature at the time of this cutting was 120° F. The cooled, salted, 4"×7"×20" loaves 14 were then allowed to float in the Main Brine Tank 15 for 3 hours.

The temperature of the brine in tank 15 was 45° F., and it had a 95% salinity. The core temperature of the cheese, when removed from the Main Brine Tank, was 65° F.

The cooled part-skim mozzarella cheese was then carried by Conveyor 16 to Cuber 17, where the cheese was immediately cubed into 2"×2"×3" chunks 18. The chunks were immediately conveyed to Dicer 19, where they were comminuted into ¼"×¼"×¼" cheese granules 20. The granules were immediately conveyed to I.Q.F. Freezer 21, which was a Frigoscandia Model 300 Flo-Freeze fluidized bed freezer like that described in U.S. Pat. No. 4,753,815. After freezing, the core temperature of the cheese 22 was −20° F. The cheese was then packaged and held for further evaluation in a freezer (not shown) maintained at 0° F.

To serve as a control, additional part-skim mozzarella cheese, which was not adjusted so as to obtain a combined moisture and milkfat content greater than 70%, was manufactured, comminuted, frozen, and packaged by the same process. This cheese will be hereinafter referred to as Control 1A. In conjunction with this, a portion of this non-adjusted part-skim mozzarella cheese was not comminuted immediately after cooling, but instead was packaged in loaf form, placed in a cooler, maintained at 38° F. for nine days, and then was comminuted, frozen, packaged, and held at 0° F. for further evaluation. This cheese hereafter will be referred to as Control 1B.

The product of this invention and the two controls were then placed in the same cooler (maintained at 38° F.) and held there until all three products reached an equilibrated temperature of 38° F. Once the products were equilibrated, each was evaluated for composition, apparent heat capacity, and melt performance. The compositions and apparent heat capacity of these products were as follows:

TABLE 1

|  | Invention Example | Control 1A | Control 1B |
|---|---|---|---|
| Moisture: | 53.5% | 52.1% | 52.1% |
| Wetfat: | 18.5% | 17.5% | 17.5% |
| Total H₂O and wetfat: | 72.0% | 69.6% | 69.6% |
| Apparent heat capacity, joules/gram: | −809.9 | −593 | −492 |

The cheeses' apparent heat capacity (also sometimes referred to as "heat index value") was measured by use of a Differential Scanning Calorimeter manufactured by Shimadzu Scientific Instruments, Inc., of Columbia, Md. The values refer to the amount of energy (in joules) required to fully melt one gram of the cheese, when heated from a room temperature starting point (approximately 21° C.). This energy is considered absorbed prior to the cheese's undergoing its phase change; therefore, it is reported as a negative value. The lower the number (i.e., the more negative it is), the greater the cheese's apparent heat capacity.

As shown in Table 1 the cheese produced by the process of the present invention exhibited a larger heat capacity than that of either control. Often the conditions and ingredients used in preparing cheese by the process of the present invention will result in the cheese having an apparent heat capacity at or below −675 joules per gram.

The melt performance of the three products was determined by cooking 11 ounces of cheese on a 13 inch (diameter) pizza (consisting of 11 ounces of unbaked dough and four ounces of tomato sauce) in a Middleby Marshall 360S oven for 6½ minutes at 530° F. This is a time and temperature combination that is commonly used to bake a pizza of this size, made of this particular dough and tomato sauce. Once cooked, each finished pizza was photographed and the cooked cheese was evaluated for the percentage and size of blisters, meltdown, stretch, and tenderness. Reproductions of the photographs constitute FIGS. 2-4 of the drawings accompanying this specification. The following observations were made with respect to the performance of the three products:

Control 1A (less than 70% combined H₂O and fat, not aged):

As seen in FIG. 2, there was a high degree of blister coverage, with the size of the blisters formed ranging from small (i.e., "point") blisters to larger scabs. The surface of the product was very dry, with no apparent milkfat being present. This is unacceptable melt performance.

Control 1B (less than 70% combined H₂O and fat, aged 9 days):

As seen in FIG. 3, there was a lesser degree of blister coverage than with Control 1A. Only point blisters were present on this pizza. The surface of the product was moist, with the presence of milkfat being visually apparent. This is acceptable melt performance, as would be expected for a part-skim mozzarella aged nine days at 38° F.

Invention Example:

As seen in FIG. 4, here, too, there was a low percentage of blister coverage and what blisters there were were point blisters. The product surface was moist in appearance, with milkfat obviously being present. This is comparable melt performance to that of Control 1B. This cheese and the cheese of Control 1B also were comparable and acceptable in terms of flavor, mouth feel, and stretch characteristics.

EXAMPLE 2

More cheese was made following the same procedure as in Example 1, but with varying moisture and milkfat levels. In all, 19 batches were made, ranging in combined moisture and milkfat content from a low of 68.2% to a high of 77.48%. None of the cheese was aged, and it was all diced into ¼" cubes and frozen by the IQF method disclosed in U.S. Pat. No. 4,753,815 immediately upon leaving the secondary brine tank.

The heat capacity of each of these cheeses was measured by the same procedure as described in Example 1. The melt performance was measured as well, by using a sample of each cheese to prepare a 13 inch pizza under the same conditions as in Example 1. Each cheese was graded using the following scale:

| Melt Performance Grades | Meanings |
| --- | --- |
| From 1 to 2 | Slight blister coverage (approximately 10-25% of the surface area) |
| From 2 to 3 | Moderate blister coverage (approximately 25-50% of the surface area) |
| From 3 to 4 | Substantial blister coverage (approximately 50-75% of the surface area) |

The scores were assigned in half-grade increments. The scoring was done "blind"—i.e., without the scorer knowing which cheese had been used. The results are reported in Table 2. The cheeses are listed in the table according to their heat capacities, in declining order (except for the aged control, which is listed last).

TABLE 2

| Lot No. | Moisture (%) | Milkfat (%) | Total (%) | Heat Capacity (j/gm) | Melt Grade |
| --- | --- | --- | --- | --- | --- |
| 209122 | 52.26 | 24 | 76.26 | −1455.7 | 2.0 |
| 109122 | 53.98 | 23.5 | 77.48 | −1328.8 | 1.5 |
| 109131 | 54.57 | 20.25 | 74.87 | −932.1 | 2.0 |
| 209312 | 53.72 | 16.5 | 70.22 | −867.1 | 2.0 |
| 109702 | 53.56 | 18.5 | 72.06 | −809.9 | 2.0 |
| 109312 | 52.96 | 16 | 68.96 | −761.5 | 3.0 |
| 109031 | 52.75 | 16.75 | 69.50 | −661.3 | 2.5 |
| 1987221 | 53.97 | 15 | 68.97 | −609.1 | 2.5 |
| 209031 | 53.42 | 16.25 | 69.67 | −597.2 | 2.0 |
| 209301 | 52.08 | 17.5 | 69.58 | −593.4 | 2.5 |
| 109111 | 50.2 | 24 | 74.02 | −573.8 | 1.0 |
| 109602 | 52.96 | 17 | 69.96 | −570.1 | 2.5 |
| 2987221 | 54.39 | 16.25 | 70.64 | −516.3 | 2.0 |
| 209702 | 52.7 | 19.0 | 71.1 | −463.6 | 3.0 |
| 209011 | 48.7 | 19.5 | 68.2 | −379 | 3.5 |
| 209111 | 49.1 | 23.3 | 72.4 | −328.8 | 1.0 |
| 109011 | 48.8 | 19.5 | 68.3 | −322.2 | 3.5 |
| 209602 | 54.05 | 15.5 | 69.55 | −284.2 | 2.5 |
| Control (Lot 10931, Aged 9 days) | 52.1 | 17.5 | 69.6 | −492 | 2.0 |

As can be seen from the above table, nine of the cheeses had combined moisture and milkfat contents of 70% or more, nine had combined contents of less than 70%, and the nineteenth batch was the conventionally aged control. Of the nine unaged batches with a fat-and-moisture content above 70%, all but one had excellent Melt Performance Grades—i.e., in the range of 1 to 2. But of the nine unaged batches with a fat-and-moisture content below 70%, only one had a Melt Performance Grade in the range of 1 to 2; five scored a generally unacceptable 2.5, one scored 3, and two scored an extremely poor 3.5.

The data in Table 2 were plotted in order to prepare a graph (FIG. 5 of the accompanying drawings) of total moisture-and-milkfat content versus heat capacity. A regression analysis was performed on the data. It showed a correlation coefficient (r) of 0.84. The higher the moisture-and-milkfat content, the greater was the cheese's heat capacity. This is generally considered by biostatisticians to represent a good correlation.

The data in Table 2 also were used to plot a graph of melt performance versus combined moisture-and-milkfat content (FIG. 6 of the accompanying drawings). Melt Performance Grades in the range of 1 to 2 are generally considered acceptable. A Grade of 2.5 or higher is generally considered to represent unacceptable blister coverage. As already mentioned, with the exception of one product, Melt Performance Grades of 1 to 2 were uniformly achieved when the combined moisture-and-milkfat content was equal to, or greater than, 70 weight percent. All but one of the unaged products containing a combined moisture-and-milkfat content below 70 percent had unacceptable Melt Performance Grades—i.e., Grades higher than 2.

We claim:

1. In a process of manufacturing a mozzarella variety of cheese comprising the following steps:

a) pasteurizing cow's milk having a fat content in the range of about 1.5 to 3.5 weight percent;
b) fermenting the milk with one or more lactic acid-producing bacteria to obtain a cheese milk;
c) coagulating the cheese milk to obtain a coagulum comprised of curd and whey;
d) cutting the coagulum and draining the whey therefrom, thereby leaving a cheese curd;
e) heating, kneading, and stretching the cheese curd until it is a homogeneous, fibrous mass of heated, unripened mozzarella variety cheese having a moisture content in the range of about 45 to 60 weight percent and a milkfat content of at least about 30 weight percent (dried solids basis);
f) cooling the heated cheese in cold brine; and
g) removing the cooled cheese from the brine; the improvement wherein (i) said steps (a) through (g) are controlled so that the cooled cheese removed from the brine has a combined moisture and wet milkfat content of at least about 70 weight percent, and (ii) said cheese is frozen within about 48 hours after being removed from the brine, thereby obtaining a mozzarella variety cheese that can be satisfactorily baked on a pizza without having to first be held in an unfrozen state at about 35° to 45° F. for approximately 7 to 21 days.

2. The process of claim 1 wherein, during step (e), there is mixed into the cheese curd about 0.5 to 1.5 percent sodium chloride (based on the weight of the cheese curd).

3. The process of claim 2 wherein the cooled cheese removed from the brine has a moisture content in the range of about 50 to 60 weight percent and a wet milkfat content in the range of about 16 to 30 weight percent.

4. The process of claim 3 wherein, in step (f), the cheese is cooled to a core temperature of about 75° F. or below, and wherein the cooled cheese is both comminuted and frozen within about 48 hours after being removed from the brine.

5. The process of claim 4 wherein, in step (e), the cheese curd is heated to a temperature in the range of about 125° to 155° F.; in step (f) the unripened mozzarella cheese is cooled to a core temperature of about 55° to 75° F.; and the cooled cheese is comminuted prior to being frozen.

6. The process of claim 5 wherein the particles of comminuted cheese are independently quick frozen.

7. The process of claim 4 wherein the particles of comminuted cheese are independently quick frozen.

8. The process of claim 3 wherein the cooled cheese is frozen within about 2 hours after being removed from the brine.

9. The process of claim 3 wherein, in step (f), the cheese is cooled to a core temperature of about 75° F. or below, and wherein the cooled cheese is comminuted and then independently quick frozen, all within about 2 hours after being removed from the brine.

10. The process of claim 3 wherein, in step (f), the heated cheese first is partially cooled in a first sodium chloride brine having a salinity of about 30 to 60 weight percent and a temperature of about 0° to 25° F., wherein it is held until the cheese's core temperature drops to about 100° F. or below, following which the partially cooled cheese is further cooled in a second sodium chloride brine having a salinity of about 50 to 98 weight percent and a temperature of about 35° to 55° F., wherein it is held until the core temperature of the cheese drops to about 75° F. or below.

11. The process of claim 10 wherein, in step (f), the heated cheese is extruded as a continuous ribbon into said first brine, and wherein said ribbon is cut into sections prior to being withdrawn from said second brine.

12. The process of claim 11 wherein the cooled sections of cheese from step (g) are comminuted and then independently quick frozen.

13. The process of claim 11 wherein the cooled sections of cheese from step (g) are comminuted and then independently quick frozen, all within about 2 hours after being removed from said second brine.

14. The process of claim 13 wherein the sections of cheese are held in said second brine until their core temperature drops to within the range of about 55° to 75° F.

15. The process of claim 14 wherein, in step (e), the cheese curd is heated to a temperature in the range of about 125° to 155° F.

16. The process of claim 15 wherein, during step (e), there is mixed into the cheese curd about 0.8 to 1.5 percent sodium chloride (based on the weight of the cheese curd).

17. The process of claim 16 wherein the cooled cheese removed from the brine has a moisture content of at least about 52 weight percent and a wet milkfat content of at least about 18 weight percent.

18. The process of claim 17 wherein the cooled cheese removed from the brine has a heat index value at or below about −675 joules per gram.

19. The process of claim 16 wherein the cooled cheese removed from the brine has a moisture content in the range of about 52 to 60 weight percent and a wet milkfat content in the range of about 20 to 30 weight percent.

20. The process of claim 11 wherein, in step (e), the cheese curd is heated to a temperature in the range of about 125° to 155° F.

21. The process of claim 20 wherein, during step (e), there is mixed into the cheese curd about 0.8 to 1.5 percent sodium chloride (based on the weight of the cheese curd).

22. The process of claim 21 wherein the cooled cheese removed from the brine has a moisture content of at least about 52 weight percent and a wet milkfat content of at least about 18 weight percent.

23. The process of claim 20 wherein the cooled cheese removed from the brine has a moisture content of at least about 52 weight percent and a wet milkfat content of at least about 18 weight percent.

24. The process of claim 23 wherein the cooled cheese removed from the brine has a heat index value at or below about −675 joules per gram.

25. The process of claim 3 wherein the cooled cheese removed from the brine has a moisture content of at least about 52 weight percent and a wet milkfat content of at least about 18 weight percent.

26. The process of claim 25 wherein the cooled cheese removed from the brine has a heat index value at or below about −675 joules per gram.

27. The process of claim 3 wherein the cooled cheese removed from the brine has a heat index value at or below about −675 joules per gram.

28. The process of claim 2 wherein, in step (f), the cheese is cooled to a core temperature of about 75° F. or below, and wherein the cooled cheese is both comminuted and frozen within about 48 hours after being removed from the brine.

29. The process of claim 28 wherein, in step (e), the cheese curd is heated to a temperature in the range of about 125° to 155° F.; in step (f) the unripened mozzarella cheese is cooled to a core temperature of about 55° to 75° F.; and the cooled cheese is comminuted prior to being frozen.

30. The process of claim 29 wherein the particles of comminuted cheese are independently quick frozen.

31. The process of claim 28 wherein the particles of comminuted cheese are independently quick frozen.

32. The process of claim 2 wherein the cooled cheese is frozen within about 2 hours after being removed from the brine.

33. The process of claim 2 wherein the cooled cheese removed from the brine has a moisture content in the range of about 52 to 60 weight percent and a wet milkfat content in the range of about 20 to 30 weight percent.

34. The process of claim 1 wherein the cooled cheese removed from the brine has a moisture content in the range of about 50 to 60 weight percent and a wet milkfat content in the range of about 16 to 30 weight percent.

35. The process of claim 34 wherein, in step (f), the cheese is cooled to a core temperature of about 75° F. or below, and wherein the cooled cheese is both comminuted and frozen within about 48 hours after being removed from the brine.

36. The process of claim 35 wherein the particles of comminuted cheese are independently quick frozen.

37. The process of claim 34 wherein the cooled cheese is frozen within about 2 hours after being removed from the brine.

38. The process of claim 1 wherein, in step (f), the cheese is cooled to a core temperature of about 75° F. or below, and wherein the cooled cheese is both comminuted and frozen within about 48 hours after being removed from the brine.

39. The process of claim 38 wherein the particles of comminuted cheese are independently quick frozen.

40. The process of claim 38 wherein, in step (e), the cheese curd is heated to a temperature in the range of about 125° to 155° F.

41. The process of claim 40 wherein, during step (e), there is mixed into the cheese curd about 0.8 to 1.5 percent sodium chloride (based on the weight of the cheese curd).

42. The process of claim 41 wherein the cooled cheese removed form the brine has a moisture content of at least about 52 weight percent and a wet milkfat content of at least about 18 weight percent.

43. The process of claim 1 wherein the cooled cheese is frozen within about 2 hours after being removed.

44. The process of claim 1 wherein, in step (f), the cheese is cooled to a core temperature of about 75° F. or below, and wherein the cooled cheese is comminuted and then independently quick frozen, all within about 2 hours after being removed from the brine.

45. The process of claim 1 wherein, during step (e), there is mixed into the cheese curd about 0.8 to 1.5 percent sodium chloride (based on the weight of the cheese curd).

46. The process of claim 1 wherein, in step (f), the heated cheese is cooled by being extruded as a continuous ribbon into cold sodium chloride brine and the cheese ribbon is held in cold sodium chloride brine until its core temperature drops to about 75° F. or below, and wherein the cooled ribbon is cut into sections and, prior to freezing, the sections of cooled cheese are comminuted, and wherein, in step (h), the cheese is quick frozen.

47. A process of making a mozzarella variety of cheese and using it to make a baked pizza, comprising the steps of:
   a) pasteurizing cow's milk having a fat content in the range of about 1.5 to 3.5 weight percent;
   b) fermenting the milk with one or more lactic acid-producing bacteria to obtain a cheese milk;
   c) coagulating the cheese milk to obtain a coagulum comprised of curd and whey;
   d) cutting the coagulum and draining the whey therefrom, thereby leaving a cheese curd;
   e) heating, kneading, and stretching the cheese curd until it is a homogeneous, fibrous mass of heated, unripened mozzarella variety cheese having a moisture content in the range of about 45 to 60 weight percent and a milkfat content of at least about 30 weight percent (dried solids basis);
   f) cooling the heated cheese in cold brine;
   g) removing the cooled cheese from the brine, said steps (a) through (g) being controlled so that the cooled cheese removed from the brine has a combined moisture and wet milkfat content of at least about 70 weight percent;
   h) freezing said cheese within about 48 hours after removing it from the brine, thereby obtaining a mozzarella variety cheese that can be satisfactorily baked on a pizza without having to first be held in an unfrozen state at about 35° to 45° F. for approximately 7 to 21 days;
   i) comminuting said cheese either before or after said step (h);
   j) spreading tomato sauce and said comminuted cheese on a base of pizza crust, with or without other toppings; and
   k) baking the coated crust in an oven maintained at a temperature in the range of about 400° to 1000° F. until said cheese is melted.

48. The process of claim 47 wherein the cooled cheese removed from the brine in step (g) has a moisture content in the range of about 50 to 60 weight percent and a wet milkfat content in the range of about 16 to 30 weight percent.

49. The process of claim 48 wherein, in step (f), the cheese is cooled to a core temperature of about 75° F. or below, and wherein the cooled cheese is comminuted before said step (h), the cheese being both comminuted and frozen within about 48 hours after being removed from the brine.

50. The process of claim 49 wherein, in step (h), the particles of comminuted cheese are independently quick frozen.

51. The process of claim 49 wherein the cheese has been kept frozen at least until 14 days prior to placing the coated crust in the oven.

52. The process of claim 49 wherein, between the time when the cheese is removed from the brine and the time when the coated crust is put in the oven, the cheese has not been held in an unfrozen state for as long as 7 days.

53. The process of claim 49 wherein the cheese has been kept frozen at least until 2 days prior to placing the coated crust in the oven.

54. The process of claim 48 wherein the cooled cheese is frozen within about 2 hours after being removed from the brine.

55. The process of claim 48 wherein, in step (f), the heated cheese is cooled by being extruded as a continuous ribbon into cold sodium chloride brine and the cheese ribbon is held in cold sodium chloride brine until its core temperature drops to about 75° F. or below, and wherein the cooled ribbon is cut into sections and, prior to step (h), the sections of cooled cheese are comminuted, and wherein, in step (h), the cheese is quick frozen.

56. The process of claim 55 wherein the sections of cheese are held in said sodium chloride brine until their core temperature drops to within the range of about 55° to 75° F. and wherein in step (e), the cheese curd is heated to a temperature in the range of about 125° to 155° F., and wherein the quick freezing of step (h) is performed within about 2 hours after said step (g).

57. The process of claim 56 wherein, during step (e), there is mixed into the cheese curd about 0.8 to 1.5 percent sodium chloride (based on the weight of the cheese curd), and wherein, in step (h), the cheese is independently quick frozen.

58. The process of claim 57 wherein the cooled cheese removed from the brine has a moisture content of at least about 52 weight percent and a wet milkfat content of at least about 18 weight percent.

59. The process of claim 58 wherein the cooled cheese removed from the brine has a heat index value at or below about −675 joules per gram.

60. The process of claim 59 wherein the cheese has been kept frozen at least until 14 days prior to placing the coated crust in the oven.

61. The process of claim 59 wherein, between the time when the cheese is removed from the brine and the time when the coated crust is put in the oven, the cheese has not been held in an unfrozen state for as long as 7 days.

62. The process of claim 59 wherein the cheese has been kept frozen at least until 2 days prior to placing the coated crust in the oven.

63. The process of claim 58 wherein the cheese has been kept frozen at least until 14 days prior to placing the coated crust in the oven.

64. The process of claim 58 wherein, between the time when the cheese is removed from the brine and the time when the coated crust is put in the oven, the cheese has not been held in an unfrozen state for as long as 7 days.

65. The process of claim 58 wherein the cheese has been kept frozen at least until 2 days prior to placing the coated crust in the oven.

66. The process of claim 56 wherein the cheese has been kept frozen at least until 14 days prior to placing the coated crust in the oven.

67. The process of claim 56 wherein, between the time when the cheese is removed from the brine and the time when the coated crust is put in the oven, the cheese has not been held in an unfrozen state for as long as 7 days.

68. The process of claim 56 wherein the cheese has been kept frozen at least until 2 days prior to placing the coated crust in the oven.

69. The process of claim 55 wherein the cheese has been kept frozen at least until 14 days prior to placing the coated crust in the oven.

70. The process of claim 55 wherein, between the time when the cheese is removed from the brine and the time when the coated crust is put in the oven, the cheese has not been held in an unfrozen state for as long as 7 days.

71. The process of claim 55 wherein the cheese has been kept frozen at least until 2 days prior to placing the coated crust in the oven.

72. The process of claim 47 wherein the cheese has been kept frozen at least until 14 days prior to placing the coated crust in the oven.

73. The process of claim 47 wherein, between the time when the cheese is removed from the brine and the time when the coated crust is put in the oven, the cheese has not been held in an unfrozen state for as long as 7 days.

74. The process of claim 47 wherein the cheese has been kept frozen at least until 2 days prior to placing the coated crust in the oven.

* * * * *